(No Model.)

H. SCHREINER.
CAR STARTER.

No. 443,211. Patented Dec. 23, 1890.

WITNESSES:
L. C. Fox
L. T. F. Johnson

INVENTOR
Henry Schreiner
BY J. N. Kalb
His ATTORNEY.

UNITED STATES PATENT OFFICE.

HENRY SCHREINER, OF PHILADELPHIA, PENNSYLVANIA.

CAR-STARTER.

SPECIFICATION forming part of Letters Patent No. 443,211, dated December 23, 1890.

Application filed May 16, 1890. Serial No. 352,042. (No model.)

*To all whom it may concern:*

Be it known that I, HENRY SCHREINER, a citizen of the United States, residing at Philadelphia, in the county of Philadelphia and State of Pennsylvania, have invented certain new and useful Improvements in Car-Starters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to car-starters, and has for its object the provision of a device whereby the pull or strain of the engines, horses, or other motive power will be saved fifty per cent. in starting, compelling the wheels to revolve instead of slipping upon the track.

The invention consists, essentially, in a draw or hitching bar having a dog or projection upon it which engages a ratchet-wheel fast upon an axle of the car. I also provide devices by means of which the operation of the draw-bar will be made automatic in its action in releasing and moving from the ratchet-wheel when the car is started, and also in regaining a position to again engage the said ratchet-wheel when the strain upon the bar is released and the car is to be again started.

The invention will be understood from the following detail description.

The accompanying drawings illustrate the invention.

Figure 1:
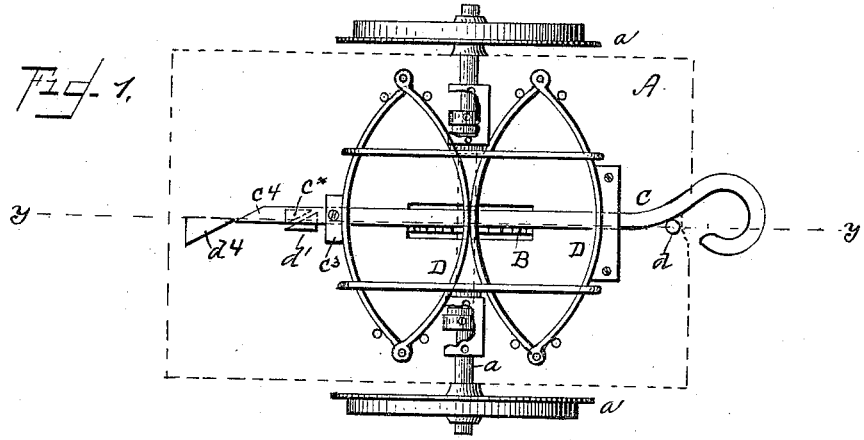
Figure 2:
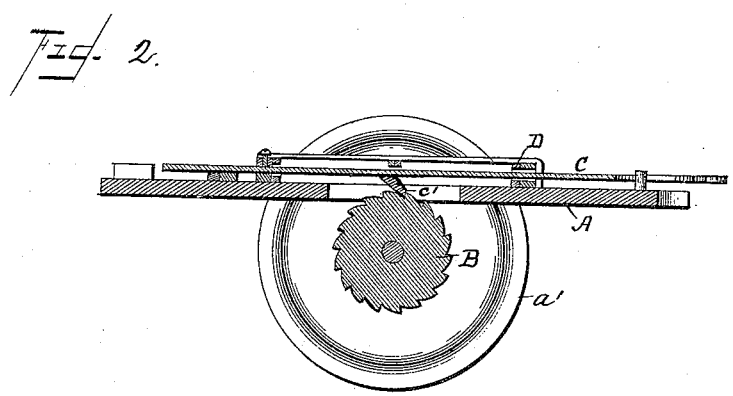
Figure 3:
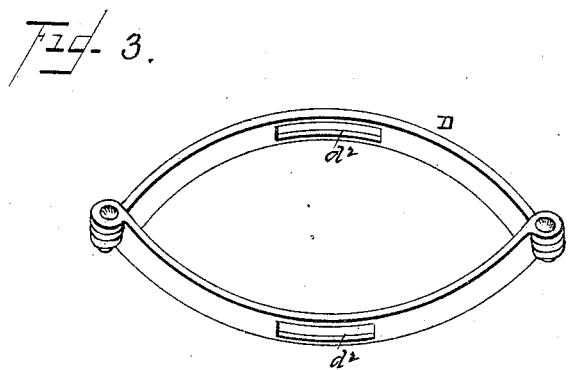

Figure 1 is a plan view of part of a truck having my starter applied. Fig. 2 is a cross-section of the same; and Fig. 3 is an elevation of the spring, showing the slots.

Similar letters of reference indicate corresponding parts in all figures where they occur.

A is a truck or such portion thereof as is necessary to illustrate my invention, and $a$ is the axle thereof. Upon this axle the wheels $a'$ $a'$ of the car are fastened in the usual way to revolve therewith, and also upon it, preferably in the middle, is fixed by a set-screw or key $a$ a ratchet-wheel B, which is engaged by the draw or hitching bar, as above mentioned.

C is the draw or hitching bar, which has a dog or projection $c'$ for engaging the ratchet-wheel when the latter is pulled or drawn forward in starting the car, so that the wheels must turn when the motive force is applied. To cause the draw-bar to slip aside and get the dog out of line with the ratchet-wheel, so that it will not interfere with the rotation of the wheels when it is once started to revolve, I provide switch-guides $d$ $d'$, which operate upon the draw-bar in its forward movement. The guide $d$ is preferably in the form of a stud, which lies in line of an incline portion $c^2$ of the draw-bar near its front end, while the guide $d'$ is preferably in the shape of a wedge, as shown in Fig. 1, and is located beneath the draw-bar near its rear end, and upon the draw-bar on its under side is provided a reversely-set wedge $c^*$ to impinge against the wedge $d'$ and throw the rear end of the draw-bar over at the same time with the front end.

When the car is stopped and the pull upon the draw-bar is released, it is necessary to throw the draw-bar backward and sidewise so as to place it again in position to engage the ratchet-wheel. For throwing the bar back I provide springs D D, having slots $d^2$ through their leaves, through which the bar C passes. An adjustable stop $c^3$ is secured on bar C behind the springs, so that the force of the springs gives a gradual and easy movement to the draw-bar. An abutment $D^*$ in front of the springs limits their movement forward. The springs will throw the bar back as soon as the pull is released from the forward end, and in its backward movement the chamfered end $c^4$ will come in contact with a wedge-shaped switch $d^4$ and throw the rod over to bring the dog upon it into line for engagement with the ratchet-wheel.

It will thus be seen that when the car is to be started, the dog will always be in line with the ratchet-wheel, and as soon as the wheels begin to revolve it will be thrown out of such engagement, and then when the car is stopped it will be thrown back into position for engagement again.

Having thus described my invention, what I claim, and desire to secure by Letters Patent, is—

1. The combination, with a ratchet-wheel upon the car-axle, of the draw-bar having the dog for engagement therewith, the disengaging guides, and the spring or springs for returning the draw-bar when the pull is removed or the car stopped, as set forth.

2. The combination, with the ratchet-wheel upon the car-axle, a draw-bar having a dog upon it for engaging the ratchet-wheel, switch-guides for throwing the dog out of engagement after the revolution of the wheel is established, springs for restoring the draw-bar when the pull is removed, and a switch-guide for throwing the dog into position for engagement, as set forth.

In testimony whereof I affix my signature in presence of two witnesses.

HENRY SCHREINER.

Witnesses:
  J. N. KALB,
  C. S. DOMER.